N. S. Thomas,
Leaching Apparatus.
N° 57,218. Patented Aug. 14, 1866.
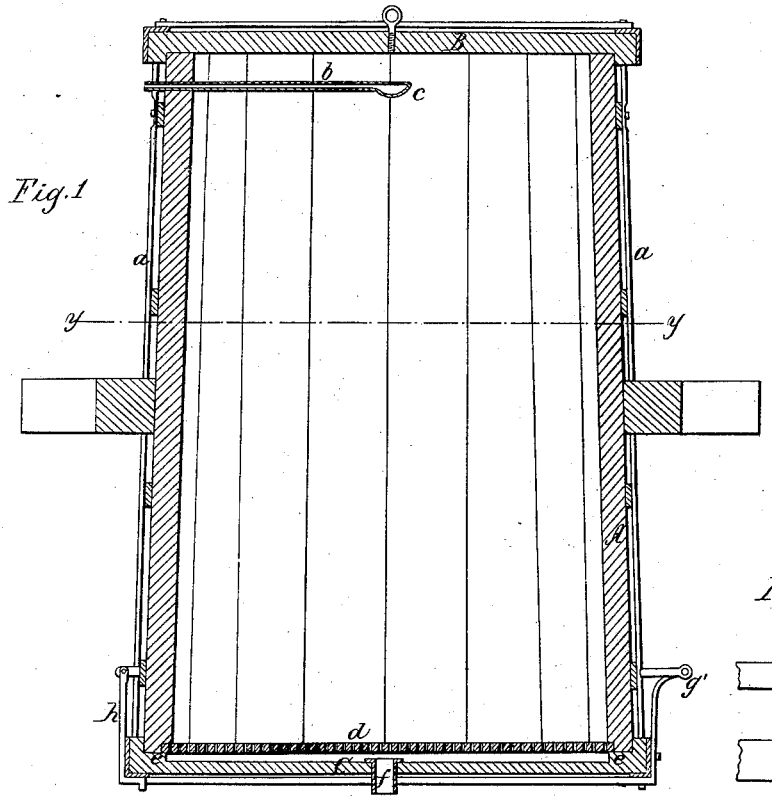
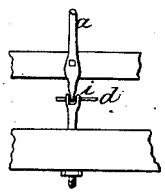
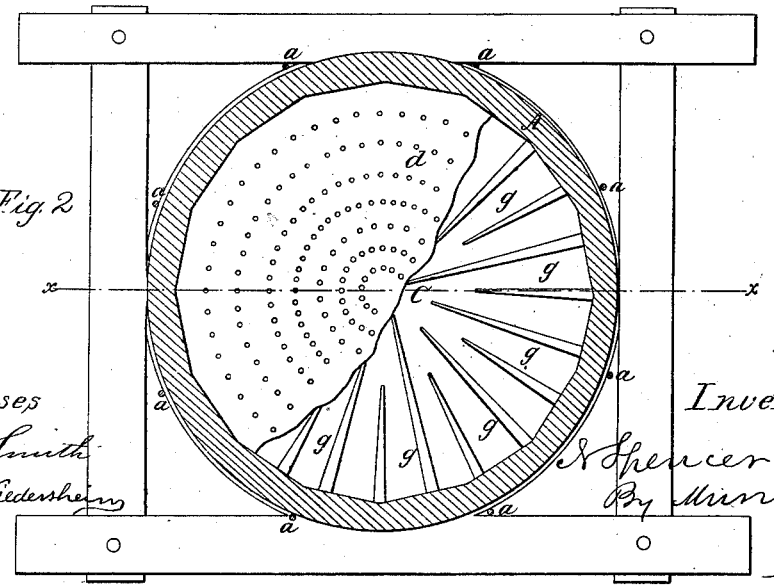
Witnesses
C. D. Smith
H. M. Wiedersheim
Inventor
N. Spencer Thomas
By Munn & Co
Attys

UNITED STATES PATENT OFFICE.

N. SPENCER THOMAS, OF PAINTED POST, NEW YORK.

IMPROVED APPARATUS FOR EXTRACTING TANNING MATTERS FROM BARK.

Specification forming part of Letters Patent No. 57,218, dated August 14, 1866.

*To all whom it may concern:*

Be it known that I, N. SPENCER THOMAS, of Painted Post, in the county of Steuben and State of New York, have invented a new and useful Improvement in Apparatus for Making Extracts; and I do hereby declare that the following is a full, clear, and exact description thereof, which will enable those skilled in the art to make and use the same, reference being had to the accompanying drawings, forming part of this specification, in which—

Figure 1 represents a vertical central section of this invention, the line $x\ x$, Fig. 2, indicating the plane of section. Fig. 2 is a horizontal section of the same taken in the plane indicated by the line $y\ y$, Fig. 1. Fig. 3 is a detached elevation of one of the tie-rods.

Similar letters of reference indicate corresponding parts.

This invention relates particularly to apparatus for extracting tan-bark; but it can be applied with advantage to making extracts of other materials or for steaming food for cattle.

The invention consists in an improved apparatus for subjecting the material to be extracted, first, to the action of steam in a leach with a perforated bottom and steam-supply pipe on top, so that the steam is compelled to pass through the entire mass of the material to be extracted before it is allowed to escape, and in applying, after the steam, hot water under pressure or at a temperature higher than the boiling-point, in order to wash out all the soluble parts contained in the material to be extracted and softened by the application of steam.

The leach, in which the operation takes place, is provided with a perforated false bottom, and the steam or water passing through the perforations is concentrated through a series of radiating channels in the central discharge-pipe, secured in the bottom of the leach. Said bottom is so arranged that it can be made to swing open in order to dump the contents of the leach when the extract is finished.

A represents a tank or leach, made of wood or any other suitable material, and in cylindrical or any desirable form or shape. It is secured at about the middle of its height in the floor of a room or apartment in the upper portion of the building, or at such a height above the ground that the bottom of the same is free and can be made to swing open.

The top B of the leach A is secured in its place by a number of screw-bolts or tie-rods, $a$, which extend over the entire height of the leach on its outer surface, and pass through flanges or rims on the top and bottom, as clearly shown in Fig. 1 of the drawings. Suitable packing introduced between the upper edge of the leach and the inner surface of the top renders the joint tight. A pipe, $b$, which ends in a rose, $c$, extends through the side of the leach, close under its top, to the center of the same, and serves to introduce steam or hot water.

The material to be extracted fills the leach up near to the supply-pipe $b$, and it rests on a perforated false bottom, $d$, which is connected to the bottom C by means of screws, being supported at a certain distance above the inner surface of the same by a rim, $e$, as shown in Fig. 1. A central pipe, $f$, emanating from the bottom of the leach, allows the steam introduced through the supply-pipe to escape, and forms the discharge for the extract, and a series of radiating channels, $g$, extending from the inner circumference of the rim $e$ to the center of the bottom C, serve to conduct the steam or liquid passing down through the perforations in the false bottom to the discharge-opening. The bottom C is secured to the leach by means of the tie-rods $a$, and it is provided with hinges $g'$ on one, and with a spring-catch, $h$, on the opposite side, so that when the tie-rods are unfastened the bottom can be made to swing open in order to dump and discharge the material contained in the leach.

The operation of unfastening the tie-rods is facilitated by making the same in two parts, which are connected by joints $i$ and pins $j$, (see Fig. 3,) so that by withdrawing said pins the lower portions of the tie-rods are separated from the upper portions and the bottom can be dumped.

The leach is filled with wet bark or other material ground to proper fineness, the lid fastened on steam-tight, and steam turned into the space between the lid and the wet bark until the whole mass is thoroughly steamed and the moisture all driven downward out of the mass of bark, and then, by means of another pipe with rose on the end of it, water from the boilers under pressure (of course highly saturated with steam) is thrown in over the mass of bark. By that act a large amount of steam is eliminated from the water; but the water still is surcharged with considerable of it, and the steam is still kept there to force the water down through the mass and still continue heating it.

The best effect is produced by leaving steam on continuously and introducing water at short intervals, the pure steam from the boilers serving to keep up a high degree of heat.

Having thus described my invention, what I claim as new, and desire to secure by Letters Patent, is—

1. The apparatus herein described, consisting of the tank A, movable top B, hinges $a'$, catch $h$, tie-rods $a$, pipes $b\ f$, rose $c$, bottom C, perforated false bottom $d$, rim $e$, and radiating channels $g$, when constructed and arranged in the manner and for the purposes specified.

2. The process herein described of extracting bark or other materials by the continuous application of steam and intermittent application of water in an apparatus of the construction specified.

The above specification of my invention signed by me this 7th day of November, 1865.

N. SPENCER THOMAS.

Witnesses:
M. M. LIVINGSTON,
O. KNIGHT.